Figure 4:
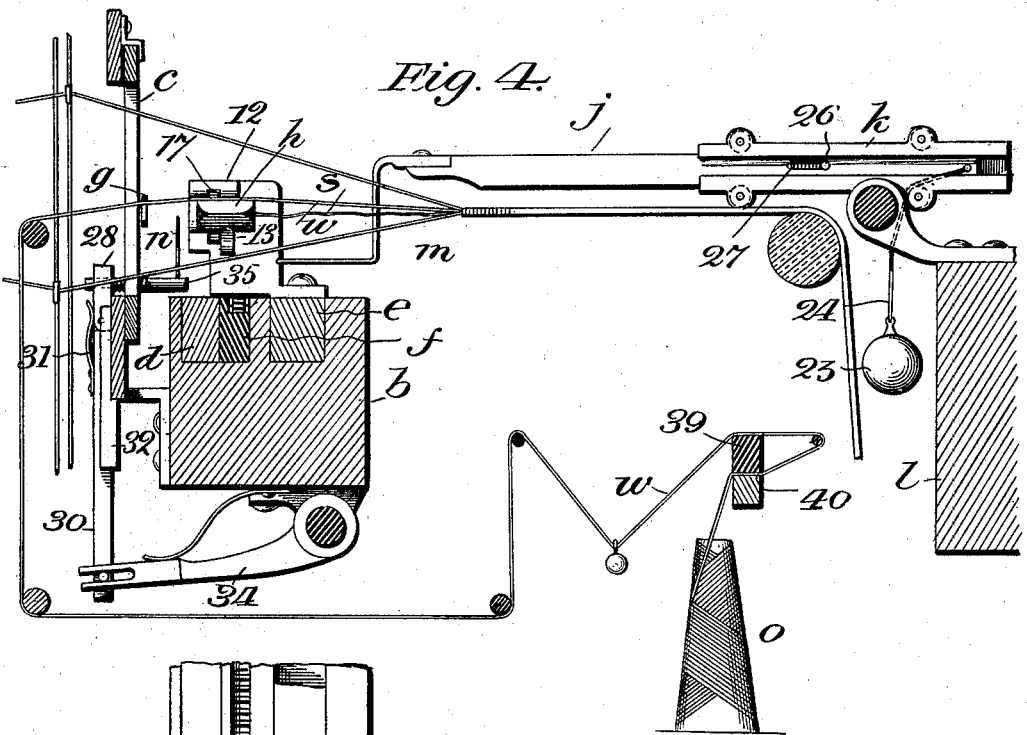

No. 653,274. Patented July 10, 1900.
W. WEAVER.
LOOM.
(Application filed Mar. 10, 1900.)
(No Model.) 8 Sheets—Sheet 1.
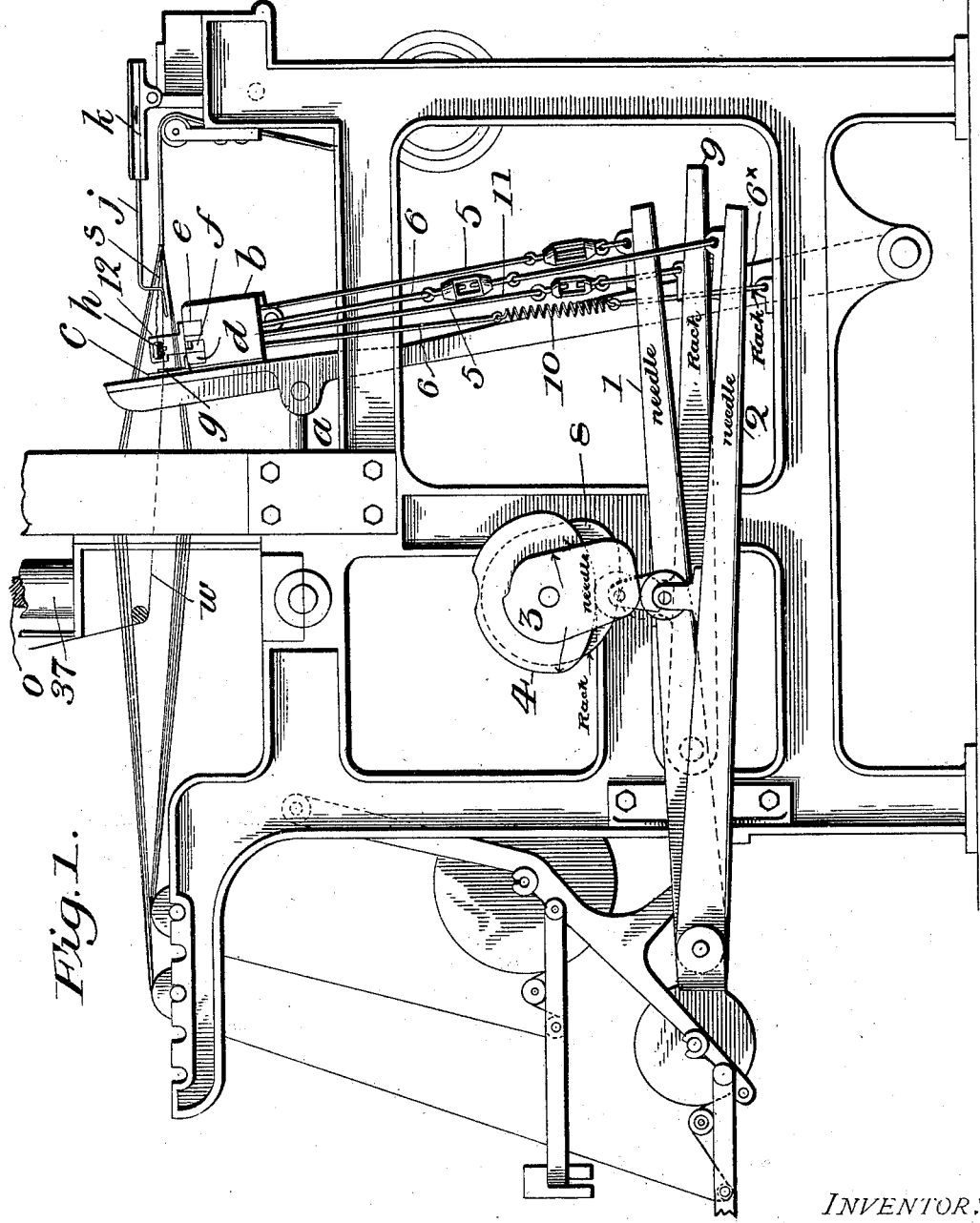
WITNESSES:
L. C. Hills.
INVENTOR:
William Weaver,
BY
Attorney

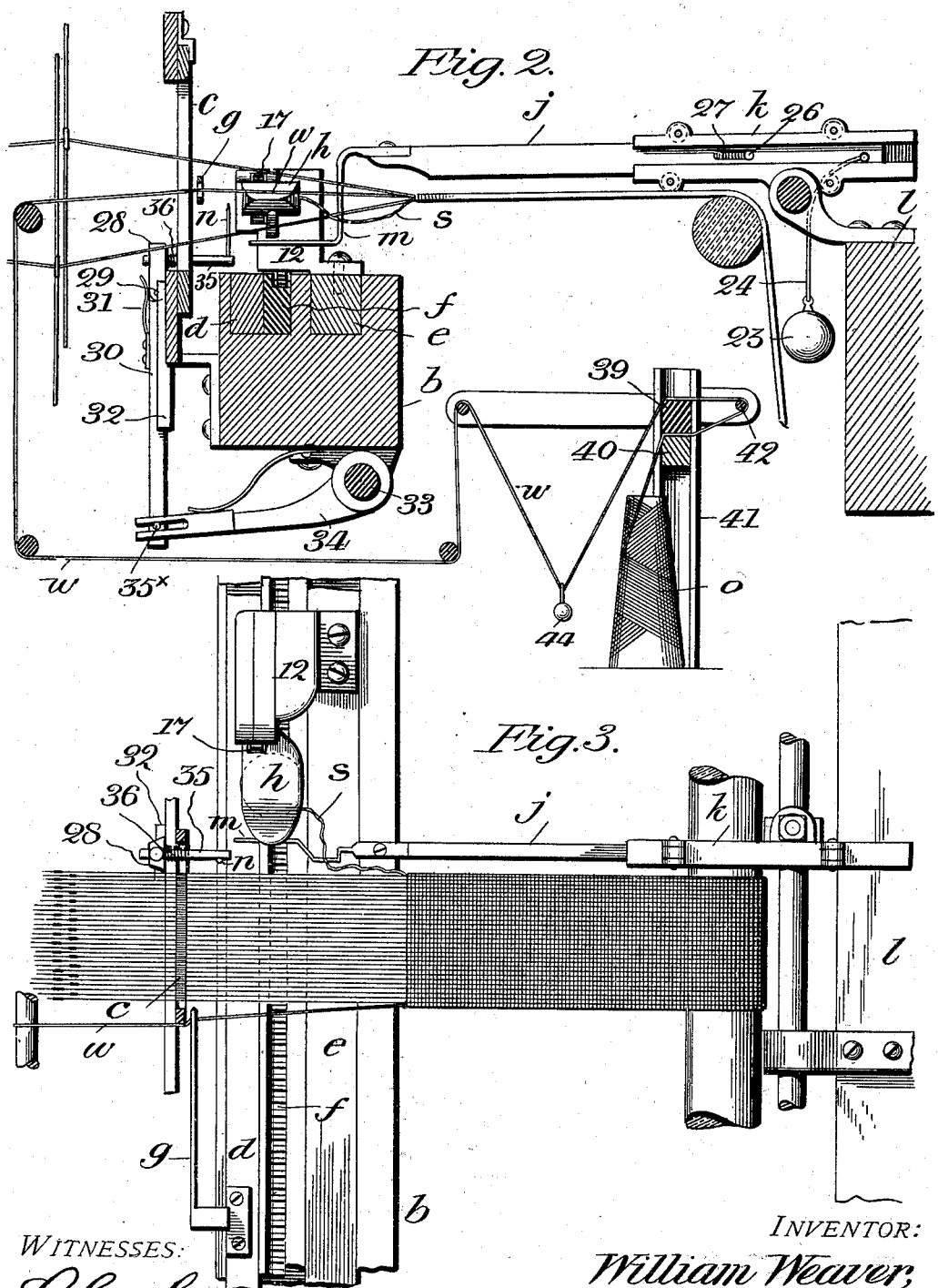

No. 653,274. Patented July 10, 1900.
W. WEAVER.
LOOM.
(Application filed Mar. 10, 1900.)
(No Model.) 8 Sheets—Sheet 3.

WITNESSES:
L. C. Hills.
Everett A. Rick

INVENTOR:
William Weaver,
BY Marcellus Bailey
Attorney

No. 653,274. Patented July 10, 1900.
W. WEAVER.
LOOM.
(Application filed Mar. 10, 1900.)
(No Model.) 8 Sheets—Sheet 4.

WITNESSES:
L. C. Hills
Ewella Dick

INVENTOR
William Weaver
BY Marcellus Bailey
Attorney

No. 653,274. Patented July 10, 1900.
W. WEAVER.
LOOM.
(Application filed Mar. 10, 1900.)
(No Model.) 8 Sheets—Sheet 5.
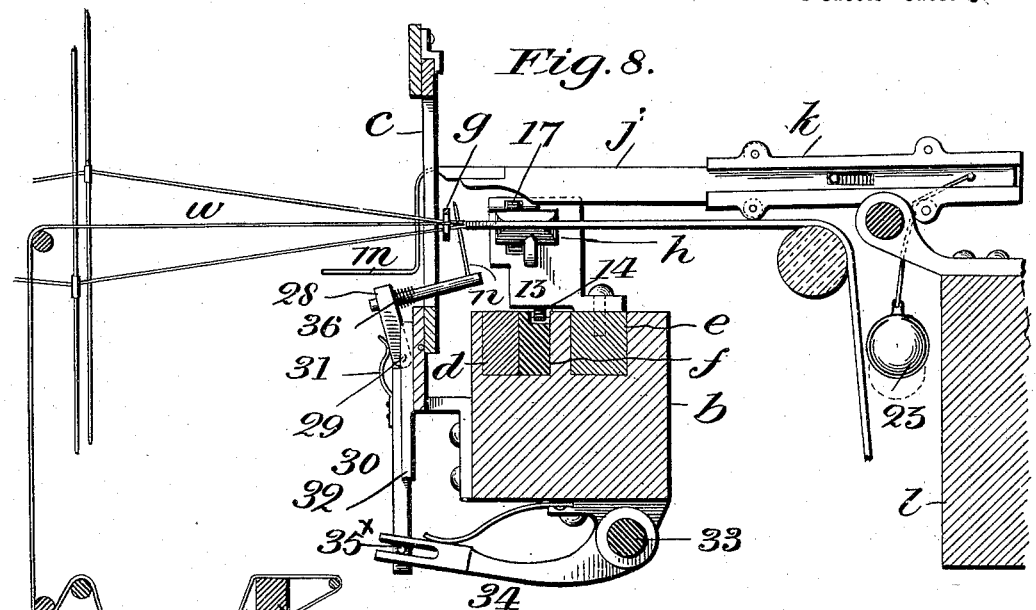
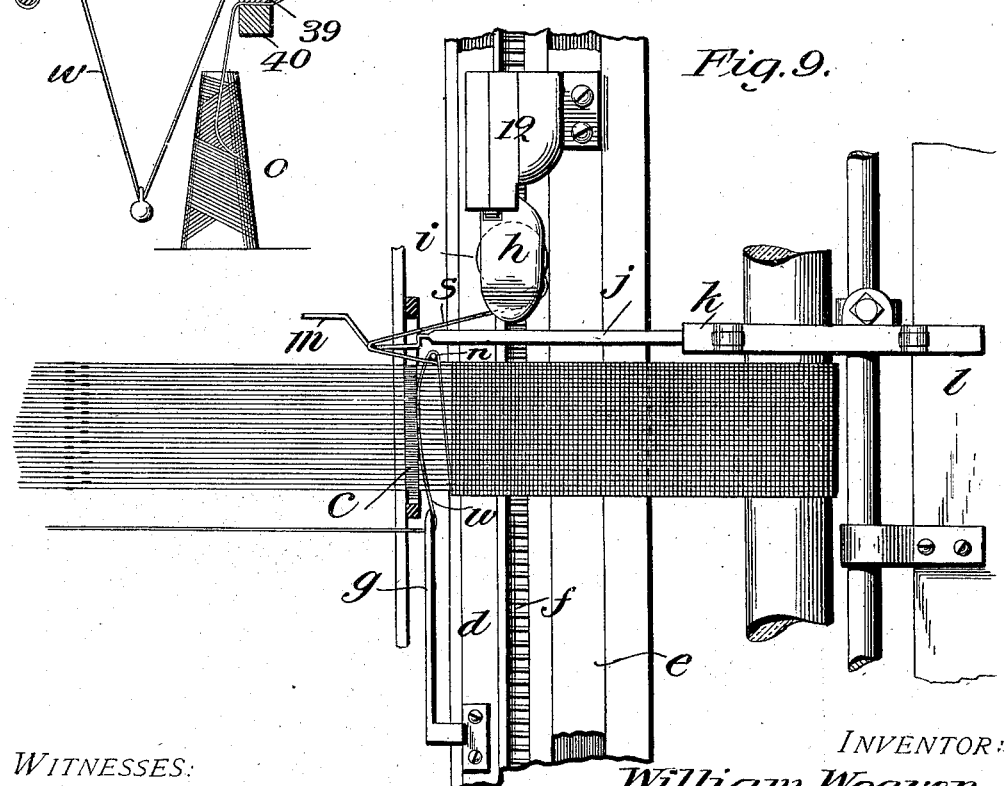
WITNESSES:
L. C. Hills
Everlea Dirk
INVENTOR:
William Weaver,
BY Marcellus Bailey
Attorney No. 653,274. Patented July 10, 1900.
W. WEAVER.
LOOM.
(Application filed Mar. 10, 1900.)
(No Model.) 8 Sheets—Sheet 6.
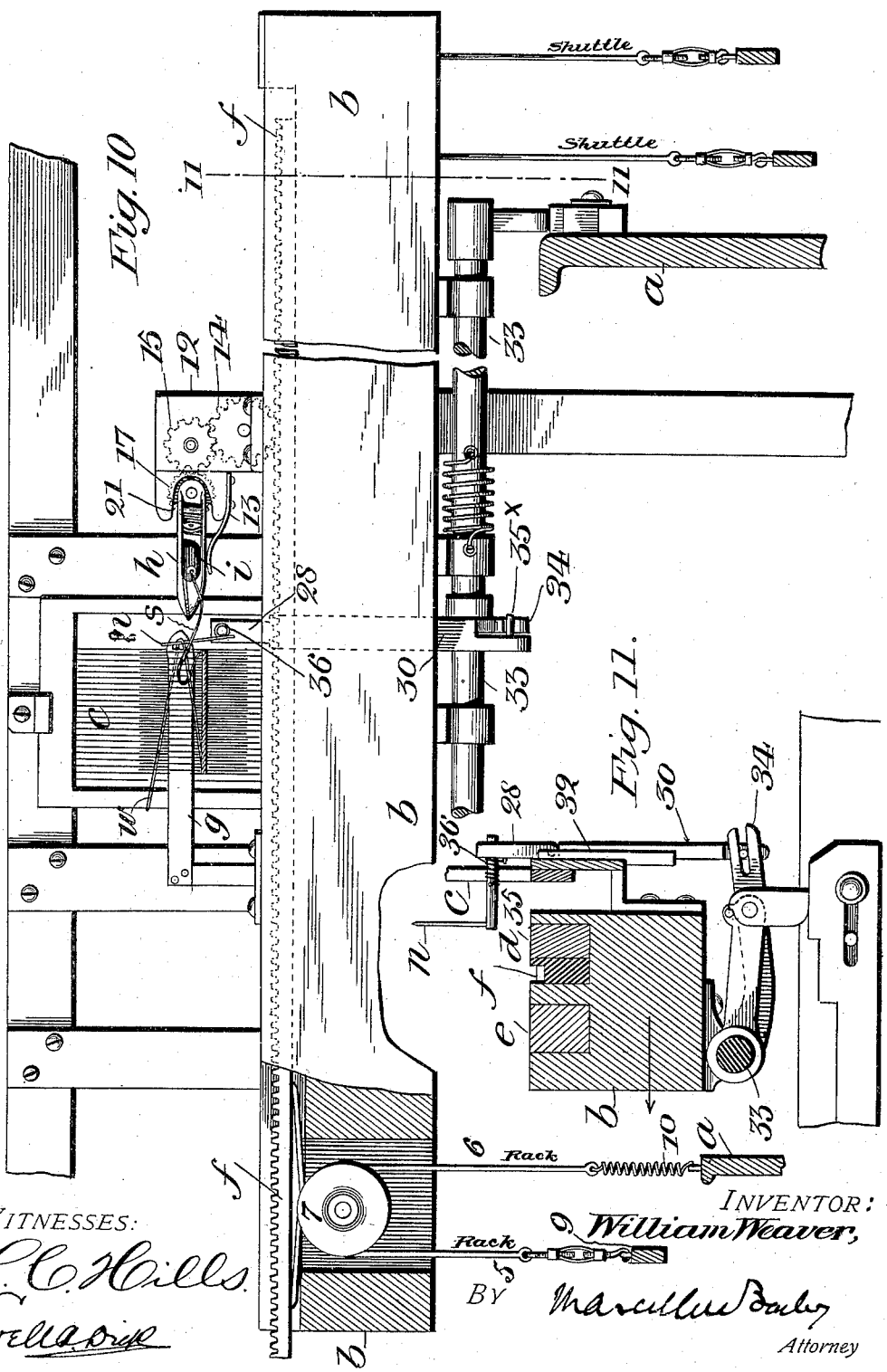
WITNESSES:
INVENTOR:
William Weaver,
BY
Attorney No. 653,274. Patented July 10, 1900.
W. WEAVER.
LOOM.
(Application filed Mar. 10, 1900.)
(No Model.) 8 Sheets—Sheet 7.
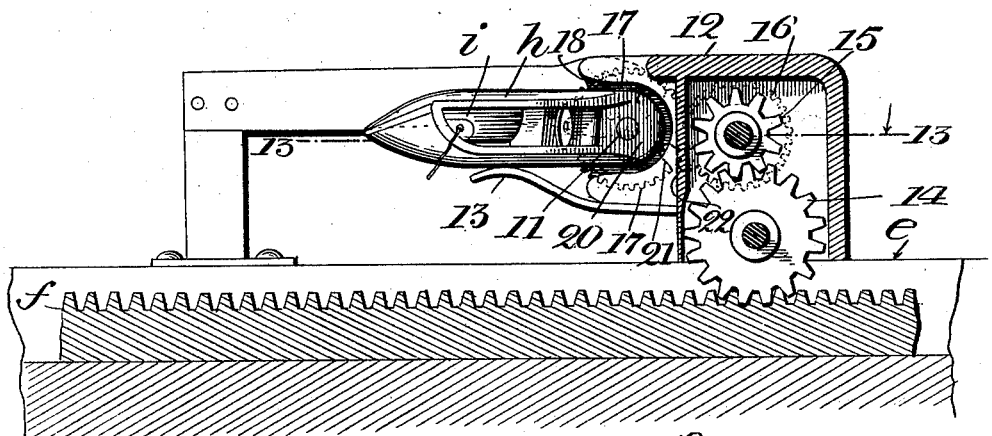
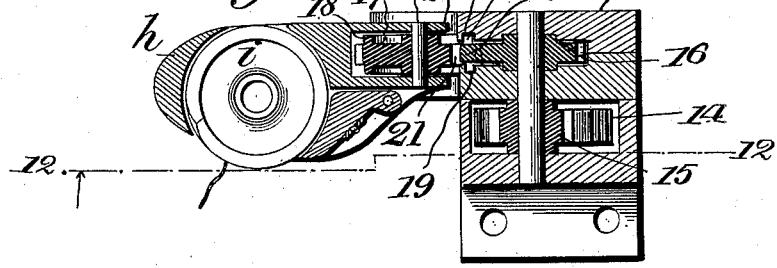
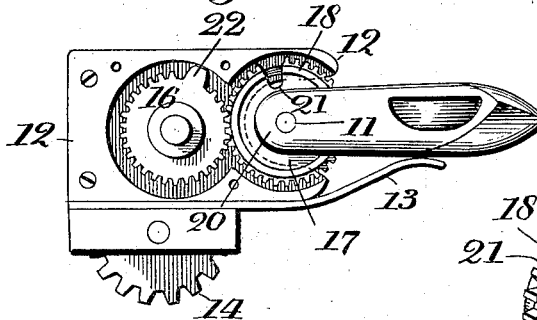
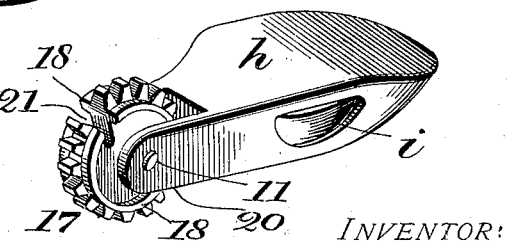
WITNESSES:
L. C. Hills
Esella Dick
INVENTOR:
William Weaver,
BY Marcellus Bailey
Attorney No. 653,274. Patented July 10, 1900.
W. WEAVER.
LOOM.
(Application filed Mar. 10, 1900.)
(No Model.) 8 Sheets—Sheet 8.

WITNESSES:
L. C. Hills.

INVENTOR:
William Weaver,
BY
Attorney

UNITED STATES PATENT OFFICE.

WILLIAM WEAVER, OF NORWALK, CONNECTICUT, ASSIGNOR OF SEVEN-TWELFTHS TO W. T. P. HOLLINGSWORTH, OF NEW YORK, N. Y.

LOOM.

SPECIFICATION forming part of Letters Patent No. 653,274, dated July 10, 1900.

Application filed March 10, 1900. Serial No. 8,185. (No model.)

*To all whom it may concern:*

Be it known that I, WILLIAM WEAVER, of Norwalk, in the county of Fairfield and State of Connecticut, have invented certain new and useful Improvements in Looms, of which the following is a specification.

My invention relates to that class of narrow-ware looms known as "needle-looms," in which the weft or filling is carried by a needle through the warp-shed in loop form and a selvage-thread is engaged with the successive filling-loops, so as to make what is commonly termed a "fast edge," said selvage-thread being upon a carrier or shuttle which sometimes has been movable and operated by appropriate mechanism to carry the selvage-thread through the successive filling-loops and sometimes has been stationary and combined with some means for carrying the successive filling-loops over or around it, so as to engage the selvage-thread.

The object of my invention is to prevent friction between the filling-loop and the selvage-thread and strain upon the latter during the operation of laying the loop in the warp-shed (which frequently results in the breakage of the thread) and to insure the formation of an even selvage.

To this end my invention consists of the parts and combinations, which I will first describe in connection with the accompanying drawings, forming part of this specification, and will then more particularly point out in the claims.

Figure 5:
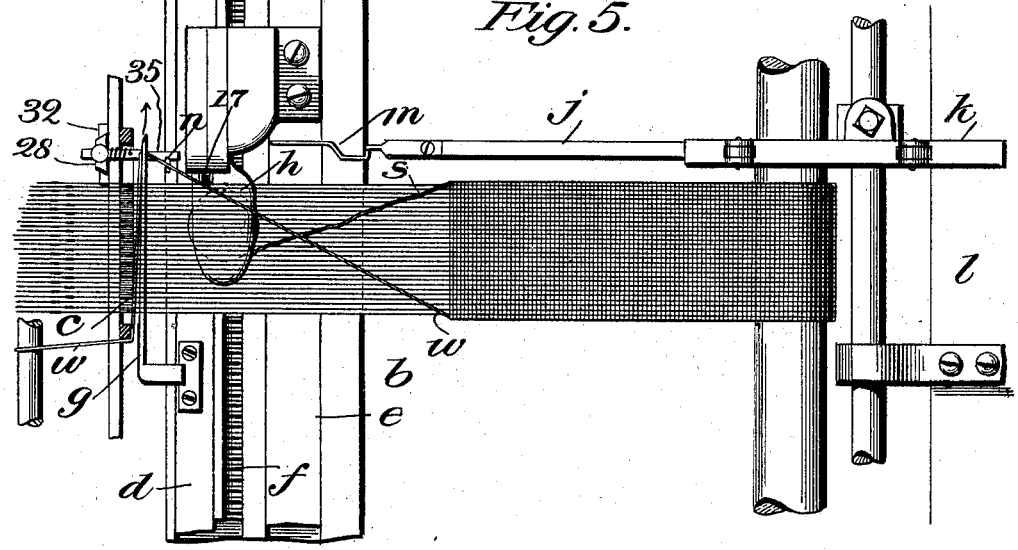
Figure 6:
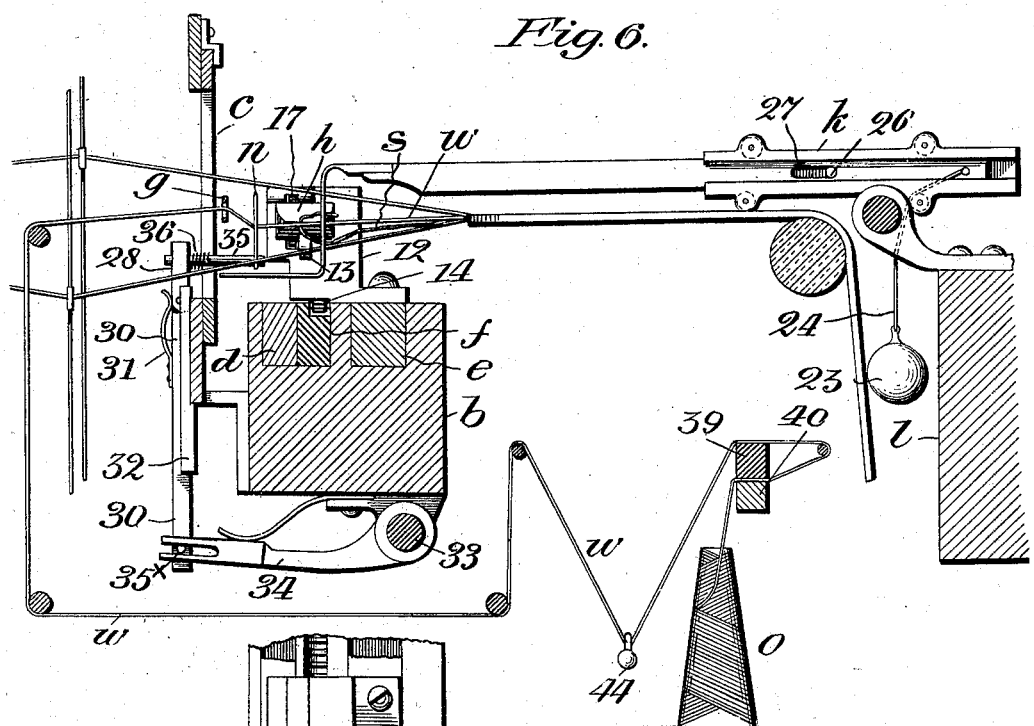
Figure 7:
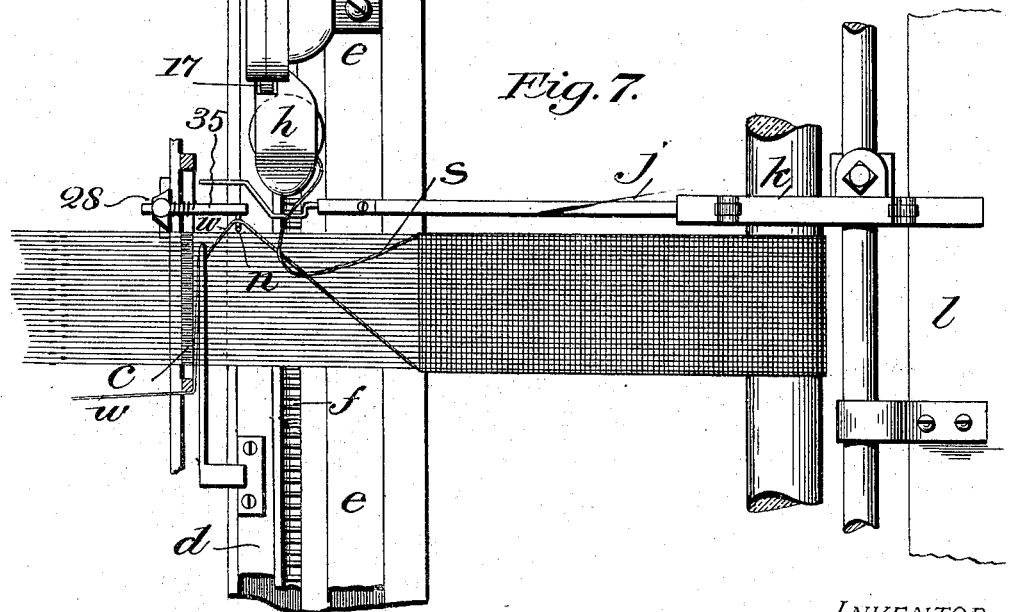
Figure 16:
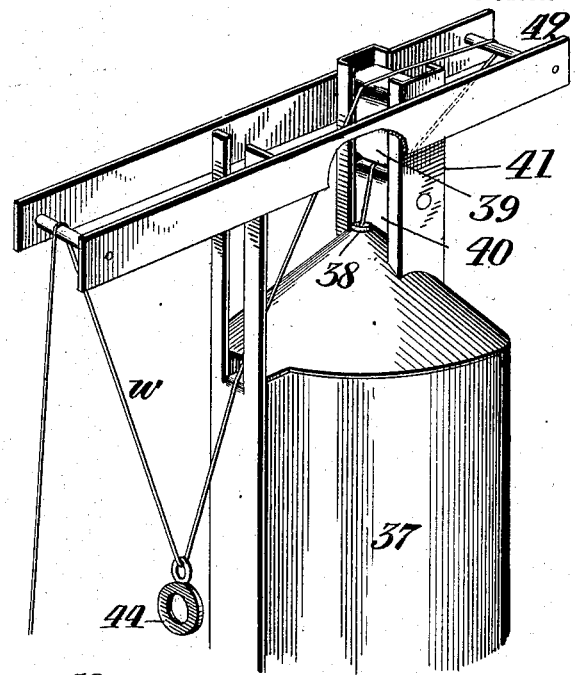
Figure 17:
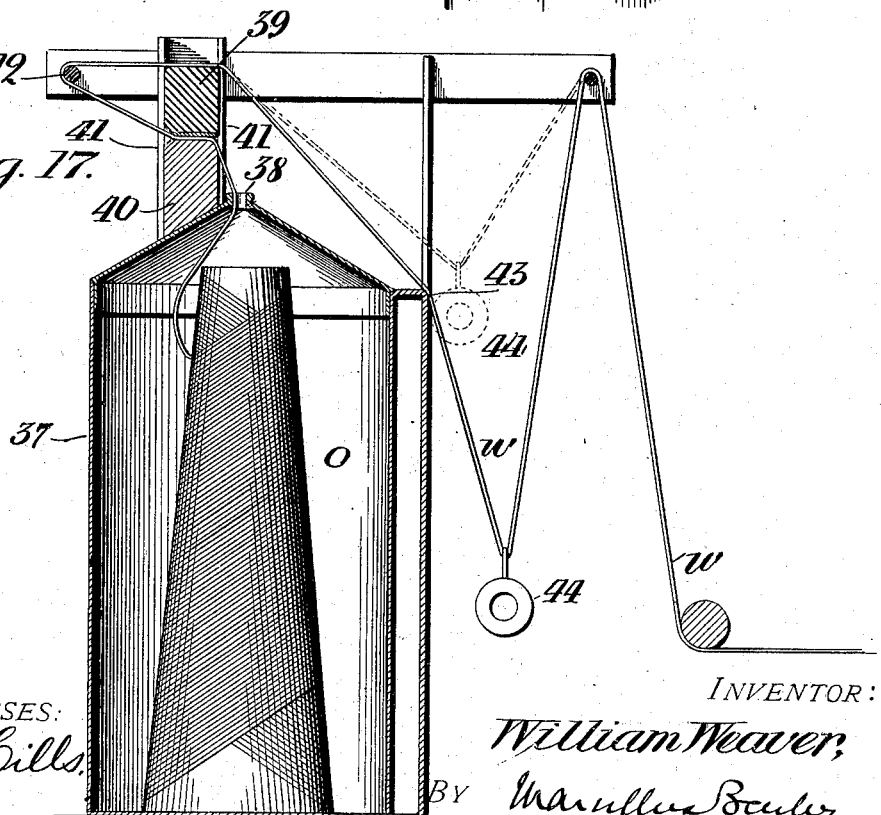

In the drawings, Figure 1 is a side elevation of so much of a loom as needed to illustrate my invention. Fig. 2 is a vertical sectional detail on enlarged scale, showing the position of parts as the lay has nearly completed its backward movement with the filling-inserting needle about to enter the shed, the selvage-thread shuttle or carrier at its extreme outward position beyond the outer edge of the shed, and the filling-loop-holding needle in its lowermost position. Fig. 3 is a plan of the parts shown in Fig. 2, omitting the filling tension and take-up. Figs. 4 and 5 are views similar to Figs. 2 and 3, respectively, with the lay in its extreme backward position and about to move forward to beat up, the filling-inserting needle passed fully through the shed, but not yet having quite completed its traverse movement in this direction, the shuttle in its extreme innermost position within the shed, and the filling-loop-holding needle in its lowermost position. Figs. 6 and 7 are views similar to Figs. 4 and 5, respectively, with the lay moving forward, the selvage-thread carrier retracted to its extreme outermost position, the filling-inserting needle withdrawing from the shed, and the filling-loop-engaging needle raised and holding the filling-loop. Figs. 8 and 9 are views similar to Figs. 6 and 7, respectively, with the lay just in the act of beating up and the filling-loop-engaging needle moved toward or against the reed and the edge of the warp. Fig. 10 is a front elevation, mainly diagrammatic, of the loom, showing the parts in the position in which they are represented in Figs. 6 and 7. Fig. 11 is a sectional detail on lines 11 11, Fig. 10. Fig. 12 is a longitudinal vertical section of the selvage-thread carrier on line 12 12 of Fig. 13. Fig. 13 is a horizontal section of the same on line 13 13 of Fig. 12. Fig. 14 is a side elevation of the selvage-thread carrier looking in the reverse direction from Fig. 12 with one of the side plates of said carrier removed. Fig. 15 is a perspective view of the selvage-thread shuttle or carrier proper, together with the toothed wheel by means of which the filling or weft loop is carried around the shuttle and selvage-thread carried by the latter. Fig. 16 is an enlarged perspective view, and Fig. 17 is a vertical section, of the weft tension and take-up.

The loom-frame is shown at *a*, and the lay at *b*, hinged to the frame and driven by suitable mechanism. These parts may be of any usual or desired construction.

Mounted upon the lay *b* in any proper manner is the reed *c*, which may be formed in sections corresponding to the number of fabrics to be woven at one time, and upon the lay are mounted so as to slide three traverse-bars *d e f*. The bar *d* carries the filling-inserting needle *g* for each section of the loom. The bar *e* carries the selvage-thread carrier *h*, and the bar *f* is a toothed or rack bar, which operates the means by which the filling-loop is caused to engage the selvage-thread. The traverse-bar *d*, by whose reciprocatory movement the filling-inserting needle is caused to traverse the warp-shed, is actuated through the instrumentality of pivoted levers 1 2, Fig. 1, actuated by power-driven rotating cams 3 4 and connected with the bar d by flexible straps 5 6, which are connected to the bar d at points some distance apart and pass in opposite directions around a double pulley 7, mounted in the lay, as indicated in Fig. 10, for the rack-bar f. A pull on one of the straps will move the bar in one direction and a pull on the other strap will move the bar in the opposite direction. The rack-bar f is actuated in the same way, save that while the filling-inserting-needle traverse-bar d is moved positively in both directions the rack-bar is by a cam 8 and lever 9 and strap 5 moved positively in one direction, while its movement in the opposite direction is accomplished by a spiral spring 10, attached at one end to the frame of the loom and at the other end to the other strap 6 of the rack-bar, as seen in Figs. 1 and 10. The weft-thread-carrier traverse-bar e is actuated by mechanism similar to that which actuates the horizontal needle traverse-bar d, but located on the side of the loom opposite to that shown in Fig. 1. Each bar d, e, and f has of course its own pair of straps 5 6.

The selvage-thread carrier (whose construction is shown in detail in Figs. 12 to 15) consists of a carrier proper or shuttle h, containing the selvage-thread bobbin i, (controlled by any suitable or usual tension,) which carrier is hinged at 11 in the yoke-like or jawed front end of a bar or case 12, which contains the parts by which the weft or filling is carried around the shuttle. The shuttle rests on an arm or support 13, from which it can lift slightly, so as to permit the passage between the two of the filling after it has been passed around the shuttle. The case 12 is attached to and moves with the traverse-bar e, and it overhangs the traverse rack-bar f. In this overhanging part of the case is mounted a pinion 14, which projects through the bottom of the case and engages the rack-bar, as seen in Fig. 12. Located above and engaging the pinion 14 is another pinion 15, mounted in the case 12, and fast on the axis of this pinion is a toothed wheel 16, which engages and drives a toothed wheel 17, mounted in the front part of the case 12, with a portion of it projecting through into the opening bounded by the yoke-like or jawed front portion of the case 12, as seen in Figs. 12 and 10. This wheel, which is the instrumentality whereby the filling is carried around the shuttle, is centered in the case 12 by annular side ribs 18, which enter conforming grooves 19 in the interior of the case, the wheel thus being held in place in the case, while being free to revolve. Its axis 11 is located between the jaws at the front end of the case 12, and it is on this axis that the shuttle is pivoted, said shuttle for this purpose being provided at its rear end with projecting arms 20, which are hung on the axis 11, as indicated plainly in Fig. 15. For the purpose of taking the filling the wheel 17 at one point on its periphery is provided with a filling-receiving notch 21, which is so deep that it extends inward toward the axis of the wheel to a point beyond the annular ribs 18. A correspondingly-large tooth 22 (but not so large as to reach the bottom of the notch) is provided on the driving-wheel 16, which engages the notch, so as to insure correspondence of movement of the two wheels. At the time the filling by the operation of the filling-inserting needle and the coöperating movement of the shuttle is carried over the top and toward the rear of the shuttle this notch 21 is flush with the top of the shuttle, so that filling will enter it, (see Fig. 5,) and as soon as the filling does enter it the wheel 17 is at once caused to revolve in a direction and far enough to carry the filling around the heel of the shuttle, the filling then being drawn off therefrom by the action of its own take-up, the filling-loop thus engaged with the selvage-thread passing out from the selvage-thread carrier between the shuttle and the arm or support 13. In order to insure this movement of the wheel 17, the rack-bar f moves when the shuttle-carrier bar e is at rest—that is to say, after the shuttle or carrier reaches its innermost position and pauses and the filling by the filling-inserting needle has been drawn over the top of the shuttle and into the notch 21 in the wheel 17 (see Fig. 5, where the filling is about to enter the notch) the rack-bar f, which up to this time and during the inward movement of the shuttle-carrier bar e has been stationary, now moves inward a short distance, and consequently the wheel 17 will revolve in a direction and far enough to carry the filling-loop around the heel of the shuttle. When this has been accomplished, the shuttle-carrier bar e recedes to its original position, as does the rack-bar also, the return movement of the rack-bar having the effect of bringing back the notch 21 to normal position.

The rack-bar has only a very limited reciprocatory movement, just enough to give the wheel 17 a movement of partial rotation of, say, two-thirds of a revolution. It is stationary during the movement of the bar e, and consequently during this movement the wheel 17 will revolve; but the parts are so proportioned and the length of the traverse of the bar e is such that at the time the shuttle reaches its innermost position, Fig. 5, the notch 21 will be in position to receive the filling.

In order to control and take up at the desired time any slack in the selvage-thread, I employ a selvage-thread controller consisting of a bar j, Figs. 2 and 3, mounted to slide in a bracket k, attached to any suitable part of the frame of the loom—as, for example, the breast-beam l—and having on its front end a bent finger m, which abuts against the selvage-thread and serves to keep it taut and take up slack in it as the lay moves forward to beat up. The bar *j* is controlled by a weight 23, which is attached to the bar by a strap 24, which passes over a pulley or roll on the bracket *k* in a direction to advance the bar *j* toward the selvage-thread. The weight is sufficient only to take up the slack, but not to draw on thread from the selvage-thread bobbin against the stress of the selvage-thread tension, and it is for this purpose that the controller is made yielding, so that after having taken up slack it may recede before the advancing lay. The extent of longitudinal movement of the slack-controller is limited by a pin 26 on bracket *k*, which engages a slot 27 in bar *j*.

In order to prevent the filling-loop from drawing upon the salvage-thread in the operation of taking up the filling and beating it up, I make use, in connection with each filling-inserting needle, of a filling-loop-engaging needle *n*, mounted on the lay to reciprocate in the path transverse to that of the filling-inserting needle, so that when the filling-inserting needle has carried the filling across the warp to engage the selvage-thread the filling-loop-engaging needle will rise in time to occupy a position where by the time the filling has been carried around the shuttle it will engage and hold the filling-loop until the latter is beaten up. To more effectually secure this end provisions are made whereby the loop-engaging needle may move or be moved during the beat-up toward the edge of the warp and also toward the reed, so that it may hold the filling-loop and relieve the selvage-thread from all friction or strain which might otherwise come upon it until the filling is beaten up and secured in the fabric. In this way a perfect and even fast-edge selvage is obtained without endangering the selvage-thread. To this end the filling-loop-engaging needle *n* is mounted in a bracket 28, hinged at 29 to a bar 30, so as to be capable of moving to and from the reed and pressed away from the reed by a spring 31. The bar 30 is mounted to slide vertically in guides 32 on the lay and may be caused to reciprocate at the proper times by any suitable means, in this instance by a rock-shaft 33, mounted on and carried by the lay and having a slotted crank-arm 34, which engages a pin 35× on the bar 30. The rock-shaft takes its movement from any suitable actuating cam mechanism. I may also provide any suitable means for moving or permitting the needle *n* to move at the proper times to and from the edge of the warp. The needle for this purpose can be made thin and elastic and of such length that under the stress of the weft or filling take-up it can during the beat up be drawn up close against the edge of the warp, or it may be hinged to its support in a position to be movable to and from the edge of the warp and be provided with a spring by which it is normally held away therefrom. The latter arrangement is clearly illustrated in Figs. 2 to 9, inclusive. In Figs. 2 to 9 the vertical needle is attached to a horizontal stem 35, mounted and capable of axial rotation in the bracket-arm 28, thus permitting the needle to oscillate to and from the edge of the warp, and it is normally held away from the edge of the warp by a spring 36. The needle will thus rise at a distance from the edge of the warp and will therefore not be liable to become entangled therewith, while at the same time at the time of the beat up and while it is holding the filling-loop it can under the stress of the filling take-up be drawn up against the edge of the warp to make a tight and even selvage. In this construction it is to be noted that the arrangement and disposition of the selvage-thread controller *j* are such that in taking up the slack it holds the thread parallel with the warp and close to the warp. (See Fig. 9.)

To control the filling, I may employ any suitable take-up and tension mechanism. That which I prefer to use is shown diagrammatically in Figs. 2, 4, 6, and 8 and in detail in Figs. 16 and 17, and in it it will be noted that there is no spring of any kind employed. The spool from which the filling is drawn is shown at *o*, surrounded by a can or case 37. Through an eye 38 in the top or cover of the same the filling *w* passes out. The filling thence passes up to and between tension-blocks 39 40, one of which, 39, is vertically movable in ways 41 and rests by gravity upon the filling, which passes between it and the block 40 below. From between the tension-blocks the filling passes up over a guide 42, thence over the top of the upper and movable tension-block 39 to and over a guide 44, and thence by suitable guides to the filling-inserting needle. The filling between the tension-block 39 and guide 42 is slack, and from this portion of the filling I suspend one or more weights 44, by which the slack portion is held taut. The weight normally is far enough below the level of the tension-blocks to draw the filling down over the top of the tension-block 39 sufficiently to cause the latter to clamp and bind the filling tightly. When, however, in the operation of the loom—as, for example, when the filling-inserting needle is traversing the warp-shed—the slack filling between the points 39 42 is drawn up, the weight 44 will be elevated, as indicated by dotted lines in Fig. 17, and in this position the filling will exercise less binding action on the tension-block 39, consequently permitting the latter to render enough of the filling to allow the weight to drop to its original position. This simple device I have found to be entirely efficient as a tension and take-up.

Such being the structural details of the loom embodying my invention, the operation thereof will be described in connection with one loom-section, it being understood that there may be as many of these sections as desired and as customary in narrow-ware looms. The different stages of one complete movement are represented in Figs. 2 to 9, inclusive, w being the filling and s being the selvage-thread. In Figs. 2 and 3 the lay is nearing the end of its backward movement from the fell of the fabric, the shed is being formed, the filling-inserting needle is in its outermost position beyond one edge of the warp, the selvage-thread shuttle is in its extreme outermost position beyond the opposite edge of the warp, and the filling-loop-engaging needle is in its lowest position. The varying position of the take-up and tension device for the filling during one complete movement is represented graphically in the several figures and does not require detailed description. As the lay reaches its rearmost position, Figs. 4 and 5, the filling-inserting needle has passed through the shed, although not yet having completed its movement in this direction, the shuttle is in its extreme innermost position in the shed, the filling w is stretched transversely across the top of the shuttle just at the mouth of the notch in wheel 17, and the filling-loop-engaging needle is still in its lowest position. The parts are thus shown in Figs. 4 and 5. Further movement of the filling-inserting needle in the direction of the arrow, Fig. 5, will carry the filling into the notch of wheel 17. The wheel then revolves to carry the filling-loop around the heel of the shuttle, and the filling-loop-engaging needle rises into position to engage the filling-loop when the latter is cast off from the shuttle, and the lay begins to move forward. The parts are shown in this position in Figs. 6 and 7, with the filling-inserting needle partly withdrawn from the shed, the filling-loop-engaging needle raised and holding the filling-loop, which has been passed around the selvage-thread s, and the selvage-thread controller about to straighten out and take up the slack of the selvage-thread. In the continued forward or beat-up movement of the lay the filling-inserting needle is entirely withdrawn from the shed, and there is during this time enhanced tension on the filling, which causes it to draw the filling-loop-engaging needle up to and against the edge of the warp, where it remains until the moment of beat up, the added resistance of the warp-threads preventing the needle from further yielding, and as the reed approaches the fell of the cloth the needle also tilts or inclines on its hinge toward the reed, so as to allow it (the needle) to hold the filling-loop until the very moment of beat up. The parts are shown in this position in Figs. 8 and 9, where the lay is in the act of beating up, the filling-inserting needle has fully withdrawn from the shed, the filling-engaging needle (inclined toward both the edge of the warp and the reed) is about to withdraw from the filling-loop, and the selvage-thread controller has straightened out and taken up the slack of the selvage-thread.

It will be understood that while I prefer the special selvage-shuttle and operating mechanism herein described, yet I do not desire to be understood as limiting my claims thereto, inasmuch as I may employ for this purpose a variety of known devices and may either move the shuttle through the filling-loop or employ means for carrying the filling-loop around the shuttle. The device which I employ for this purpose—viz., the notched wheel 17—is, in effect, a rotary looper or hook analogous to that used in sewing-machines to carry the needle-thread around the under or bobbin thread, and I shall therefore term it "looper" in the claims.

It will be noted that the selvage-thread is under no injurious stress at any time and that all friction between it and the filling and all direct pull upon it by the filling, even up to the time of actual beat up, are avoided, while at the same time all of the three instrumentalities—the filling-inserting needle, the selvage-shuttle, and the filling-loop-engaging needle—which coöperate to this end are all of them mounted on and move with the lay, thus insuring rapidity and certainty of operation. This feature I believe to be new with me beyond its structural embodiment hereinbefore set forth. I am thus enabled to run the loom rapidly without danger of breaking the selvage-thread or of drawing it into the fabric and to obtain in a fabric in which the filling is laid in continuous loops an even uniform selvage and a fast edge.

Having thus described my invention, what I claim herein as new, and desire to secure by Letters Patent, is as follows:

1. In a loom, the combination substantially as set forth of the following elements: a lay, a reed thereon, a filling-inserting needle mounted on, and movable lengthwise of, the lay, a selvage-thread shuttle or carrier mounted on the lay, means for engaging the filling with the selvage-thread, and a filling-loop-engaging needle also mounted on the lay and movable in a path transverse to that of the filling-inserting needle to enter and engage the weft-loop and hold the same during the take-up operation so as to free the selvage-thread from strain at this time.

2. In a loom the combination substantially as hereinbefore set forth, of the following elements: a lay, a reed thereon, a filling-inserting needle movable lengthwise of the lay, a selvage-thread shuttle or carrier, means for engaging the filling with the selvage-thread, a filling-loop-engaging needle, and provisions for moving said filling-loop-engaging needle toward the reed and the edge of the warp.

3. In a loom the combination substantially as hereinbefore set forth, of the following elements: a lay, a reed, mounted thereon, a filling-inserting needle mounted on and reciprocable lengthwise of the lay and entering the warp-shed from one edge thereof, a selvage-thread shuttle also mounted on and reciprocable lengthwise of the lay and entering the warp-shed from the opposite edge thereof, a looper carried by and movable with said shuttle, and operating means whereby said looper is caused to pass the filling-loop around the shuttle.

4. The combination with the filling-inserting needle of the selvage-thread shuttle and its supporting-case, the traverse-bar carrying the same, the looper mounted in said case, gearing for driving said looper, and a traverse rack-bar engaging said gearing—the combination being and acting substantially as hereinbefore set forth.

5. In a loom the combination substantially as hereinbefore set forth of the following elements: a lay, a reed mounted thereon, a filling-inserting needle mounted on and movable lengthwise of the lay, a filling-loop-engaging needle mounted on the lay and movable in a path transverse to that of the filling-inserting needle to enter and engage the weft-loop and hold the same during the take-up operation so as to relieve the selvage-thread from strain at this time, a selvage-thread shuttle or carrier, mounted on the lay, means for engaging the filling with the selvage-thread, and a controller for taking care of the slack selvage-thread during the forward movement of the lay.

In testimony whereof I have hereunto set my hand this 28th day of February, 1900.

WILLIAM WEAVER.

Witnesses:
ALFRED M. SEAMAN,
FREDERICK C. ROWLEY.